US008447673B1

(12) United States Patent
Horbal

(10) Patent No.: US 8,447,673 B1
(45) Date of Patent: May 21, 2013

(54) METHOD AND SYSTEM FOR EFFICIENT FUNDING OF GIFT AND REWARD CARDS

(75) Inventor: Mark Horbal, Chicago, IL (US)

(73) Assignee: SHC Direct, L.L.C., Oakbrook Terrace, IL (US)

( * ) Notice: Subject to any disclaimer, the term of this patent is extended or adjusted under 35 U.S.C. 154(b) by 0 days.

(21) Appl. No.: 13/113,115

(22) Filed: May 23, 2011

(51) Int. Cl.
*G06Q 40/00* (2012.01)

(52) U.S. Cl.
USPC ................................................ 705/35; 705/40

(58) Field of Classification Search
USPC ........................................................ 705/40, 35
See application file for complete search history.

(56) References Cited

U.S. PATENT DOCUMENTS

| | | | | |
|---|---|---|---|---|
| 6,032,859 | A * | 3/2000 | Muehlberger et al. | 235/449 |
| 6,820,061 | B2 * | 11/2004 | Postrel | 705/14.27 |
| 6,886,742 | B2 | 5/2005 | Stoutenburg et al. | |
| 7,191,939 | B2 | 3/2007 | Beck et al. | |
| 2003/0212796 | A1 * | 11/2003 | Willard | 709/227 |
| 2004/0006487 | A1 * | 1/2004 | Tari | 705/1 |
| 2004/0058705 | A1 * | 3/2004 | Morgan et al. | 455/556.1 |
| 2006/0085231 | A1 | 4/2006 | Brofman | |
| 2007/0198352 | A1 | 8/2007 | Kannegiesser | |
| 2008/0172306 | A1 | 7/2008 | Schorr et al. | |
| 2009/0164320 | A1 | 6/2009 | Galit | |
| 2009/0271253 | A1 | 10/2009 | Arazy et al. | |
| 2010/0010918 | A1 * | 1/2010 | Hunt | 705/27 |

OTHER PUBLICATIONS

Calabro, Lori, "Fill 'er up. (E-Payments)"; Apr. 2007; ISSN: 8756-7113.*
Derivatives_Week; "Credit Where Credit is Due"; Sep. 25, 2000; ISSN: 1075-2412.*
Credit_Card_Management; "When the bill comes due"'; Jun. 1994; ISSN: 0896-9329.*

* cited by examiner

*Primary Examiner* — Edward Chang
(74) *Attorney, Agent, or Firm* — Patzik, Frank & Samotny Ltd.

(57) ABSTRACT

A system and method that delays or eliminates the initial funding of cards having a stored or redemptive value. A database or other data storage device stores card identifying information until such time that an actual request for use of the card is made, or until the system otherwise determines that the card has expired. If the system determines that the card has expired prior to a redemption request, the card will not be funded, thereby allowing the merchant to avoid paying financing charges associated with the funding of the card. If the card is still valid, the applicable purchase value from the consumer's transaction will be subtracted from the card's value. In one embodiment, if the amount of the purchase exceeds the redemptive value of the card, the card may be used without having to fund the card. If there is value left on the card after the transaction, the card may be funded and the remaining value stored for future use.

19 Claims, 4 Drawing Sheets

METHOD AND SYSTEM FOR EFFICIENT FUNDING OF GIFT AND REWARD CARDS

FIELD OF THE INVENTION

The invention relates to gift cards and reward cards, and more particularly, to a system and method for reducing the costs associated with the issuance and use of cards such as gift and reward cards.

BACKGROUND OF THE INVENTION

In addition to cash, checks and credit cards, many businesses now accept cards that have a stored or redemptive value. Two examples of such cards are gift cards and rewards cards. Gift cards are purchased by a consumer for future use by the consumer or as a gift for a third party to use and are generally purchased for a particular dollar value that becomes the value of the card. Reward cards, on the other hand, are given to one or more consumers to encourage shopping and/or as a reward for particular actions such as, but not limited to, business loyalty, frequent shopping, or purchasing one or more particular goods or services.

With the prevalence of e-transactions, in addition to physical cards, stored or redemptive value cards such as gift and reward cards also can be used as virtual cards. Physical cards are typically made of plastic or a laminated or thick paper stock and carry unique identifying information pertaining to the number of the account. In many cases, this information may be stored in, among other places, a magnetic strip or machine readable barcode on the card. Virtual cards on the other hand are typically delivered by electronic means such as, but not limited to, through websites, mobile devices, MMS messaging or SMS messaging. Virtual cards can take many forms including, but not limited to, images, a message, or a unique number contained in a message.

The primary parties other than the consumer typically involved in gift card and reward card transactions are merchants and a third database of record (e.g., Ceridian). An example of the typical interaction between merchants and the database-of record is shown in FIG. 1. To start, the database of record generates or creates one or more unique card numbers in step 10 and provides the merchant with those numbers in step 20, wherein the merchant can create or obtain cards with the numbers or store them for subsequent use. When a card is purchased, the merchant in step 30 funds the card with an initial balance that is transmitted to the database of record, which stores the current balance in step 40. If desired and allowed, the merchant can optionally set an expiration date for the card in step 50. When the card is presented for use, the merchant in step 60 scans or otherwise inputs or transmits information regarding the card to the database of record to check the balance of the card, which is returned by the database of record in step 70. Once the balance is transmitted to the merchant, the purchase price of the good(s) or overall transaction may be subtracted from the card's balance in step 80. If the card's value exceeds the subtracted amount, the remainder of the card's balance will be stored at the database of record in step 90. Once the card's balance reaches zero or the set expiration date passes, the card will expire and its balance, if not already set, will be reduced to zero in step 100.

In operation, the database of record charges a fee (e.g., a percentage of the card's value) for its various services related to the financing and management of the cards. The fees, which are generally transactionally-based, are charged regardless of whether the cards are actually used by the consumers. As a result, the process can be very inefficient for a merchant who must pay for services related to cards that may never be used by the consumers for any of a variety of reasons (e.g., card was lost, personal choice, etc.).

Therefore, there is a need to create a system and method for reducing costs associated with the issuance and use of gift and reward cards by merchants or other entities.

SUMMARY OF THE INVENTION

The present invention is an improvement over the prior art in the way that it delays or eliminates the initial funding of the cards in that the funding transaction that establishes an initial balance at the database of record is delayed until the request for the card takes place. In one embodiment, the system of the present invention includes a merchant system, a consumer or consumer system and a database of record system that communicate with one another.

Once card identifying information (e.g., an identifying numerical code) is obtained or stored, the value of the card and any other pertinent information such as, but not limited to, the holder information and any expiration date or other limitations on the card's use, is stored in a database or other data storage device. This information is retained until it is determined that the card has been presented for use by the holder or is otherwise removed due to the expiration of the card. If it is determined that the card has expired prior to a redemption request, the card will not be funded, thereby allowing the merchant to avoid paying financing or other charges to the database of record. If the card is still valid, the applicable purchase value from the consumer's transaction will be subtracted from the card's value. In one embodiment, if the amount of the purchase exceeds the redemptive value of the card, the card may be used without having to fund the card. If there is value left on the card after the transaction, the card may be funded and the remaining value stored for future use.

It is therefore an object of the present invention to create a system and method for permitting efficient funding of reward and gift cards.

It is also an object of the present invention to create a system and method for delaying the initial funding of cards until the cards are actually presented or offered for use.

Yet another object of the present invention is to create a system and method that can eliminate the initial funding step for cards having a stored or redemptive value in certain transactions.

Other objects, features and advantages of the invention will be apparent from the following detailed disclosure, taken in conjunction with the accompanying sheets of drawings, wherein like reference numerals refer to like parts.

DETAILED DESCRIPTION OF THE INVENTION

Figure 1:
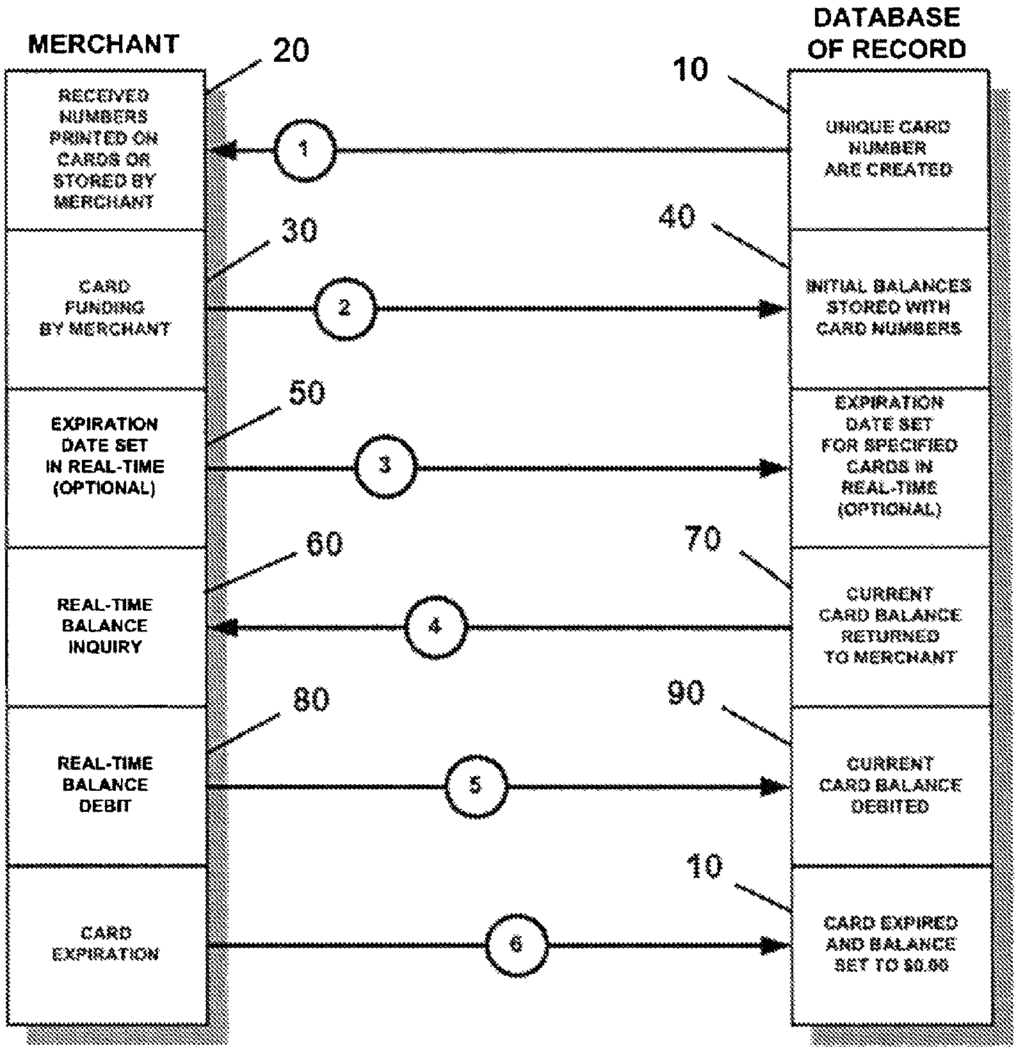
FIG. 1 is an exemplary schematic diagram of the steps involved in the interaction between a merchant and a database of record regarding the issuance and use of prior cards.

While this invention is susceptible of embodiment in many different forms, there is shown in the drawings and will herein be described in detail several specific embodiments, with the understanding that the present disclosure is to be considered merely an exemplification of the principles of the invention.

Figure 2:
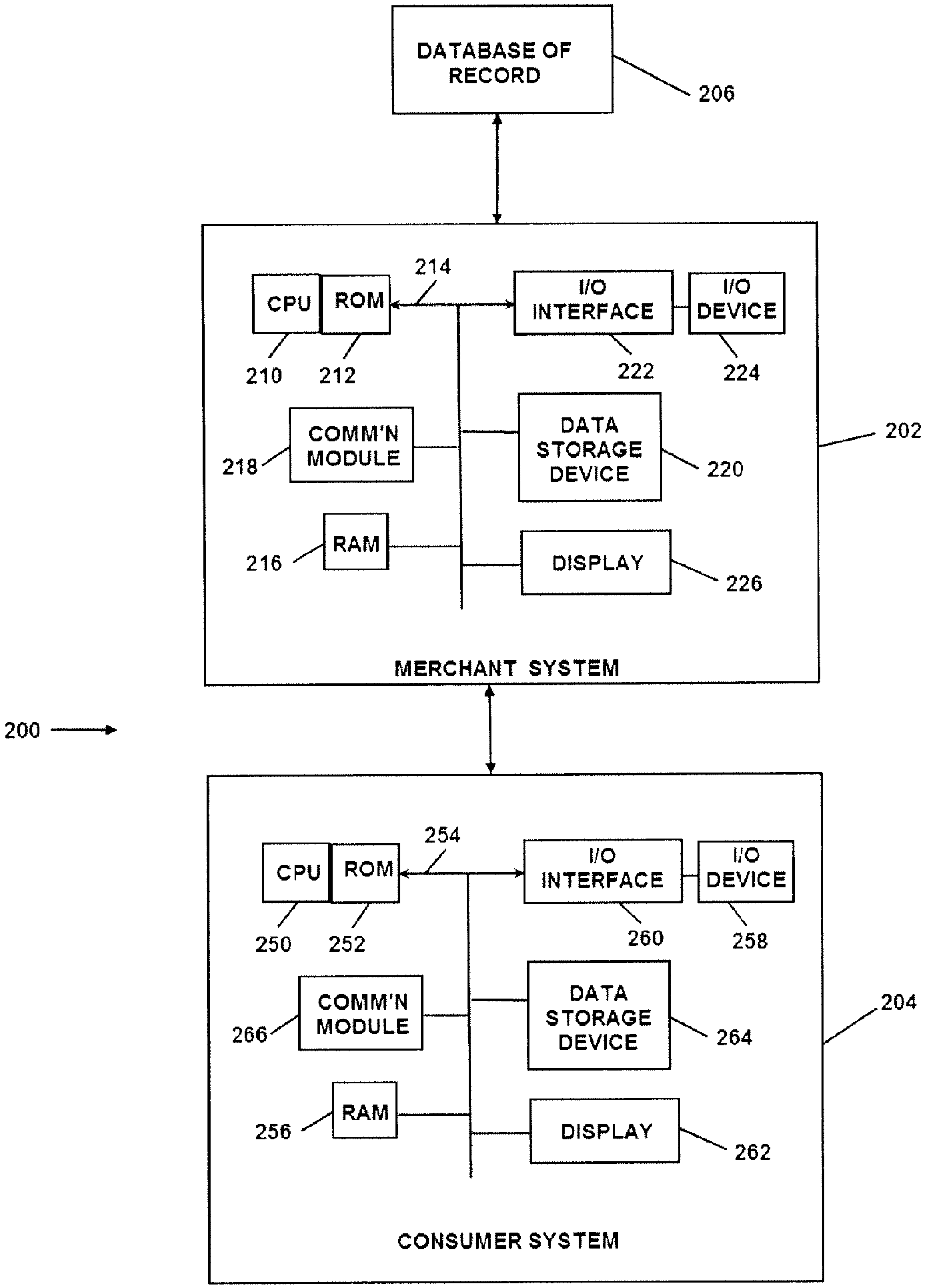
FIG. 2 shows an exemplary schematic illustration of a card system according to an embodiment of the present invention.

As depicted in FIG. 2, one embodiment of the card system 200 of the present invention may include a card or merchant system 202, a consumer system 204 and a database of record system 206. The card or merchant system may be any of the suitable computer systems that permit information to be stored regarding the cards and communication to occur between the merchant system and the consumer and database of record. The merchant system may include: a central processing unit (CPU) 210 and associated read-only memory (ROM) 212, both of which may be connection along data and address bus lines 214 to a random access memory (RAM) 216; a communication module 218 that allows the merchant system 202 to communicate with a consumer 204 and the database of record 206; a database or data storage device 220 that stores, among other things, information regarding the virtual cards, the holder, the value of the cards, and any expiration information or other limitations of the card; at least one input/output (I/O) interface 222; an I/O device 224; a display 226; and other known hardware and software for performing the various methods discussed herein. The CPU 210 is operatively connected to the I/O interface 222 to control any corresponding I/O devices 224 such as, but not limited to, keyboards, mice or joysticks. The computers also include an operating system (not shown) that controls various applications such as, but not limited to: data management, storage and retrieval; Web browsing applications; and communication applications that allow the computer to communicate with other computers over the Internet. The operating system may be any standard operating system such as, but not limited to, Windows.

For purposes of this disclosure, it is appreciated that the database of record refers to a computer-based system such as the one disclosed above for the merchant system that, among other things, permits the receipt and transmission of communications with at least the merchant system, and which has a memory to store data and information regarding future transaction and the remaining values of the card. An example of a system is that of Ceridian®.

In connection with a virtual card, the consumer system may be a computer or mobile device, or any other device that is suitable to store and maintain virtual cards, associated with a consumer. Examples of a mobile device include, but are not limited to, mobile telephones capable of text messaging; mobile telephones capable of Internet access and hosting applications that use the Internet; and other electronic devices capable of communicating with the Internet over wireless "Wi-Fi". In the case of the mobile device or computer, as shown in FIG. 2, it may include: a central processing unit (CPU) 250 and associated read-only memory (ROM) 252, both of which are connected along data and address bus lines 254 to: a random access memory (RAM) 256; a user I/O device 258; an I/O interface device 260; a display 262; a data storage device 264; a communication module 266; and software that permits implementation of the various virtual computing functions set forth or that may be required herein such as but not limited to data management, storage and retrieval.

It is appreciated that the mobile device or computer may communicate with the merchant system in a variety of ways. For example, the mobile device, among other things, can communicate over the mobile carrier's data services such as, but not limited to, EVDO, 3GS or Wi-Fi. It is also appreciated that, once received, the virtual card may be printed out by the consumer for use. In such a case, or in the case of a physical card, the consumer may take the card directly to the merchant or point of sale location, or enter the card identifying information through an online website associated with the merchant.

When an actual or physical card (or a printed virtual card) is taken to the point of sale ("POS") location for use, it is appreciated that the merchant system may include one of the known POS terminals that include, among other things, a magnetic strip reader or other means for obtaining or reading information about the card.

The description of the invention will be accomplished via a number of cases, which are merely exemplary and are not intended to limit the scope of the present invention. While physical and virtual gift and reward cards are disclosed herein, it is appreciated that cards refers to any of the known types of cards or their equivalents, including those cards or facsimiles in physical, virtual, electronically displayed or delivered, or printed facsimile or form (e.g., a copy of a card or a printed sheet containing identifying information such as a number of associated bar code that refers or relates to a gift or reward program).

Figure 3:
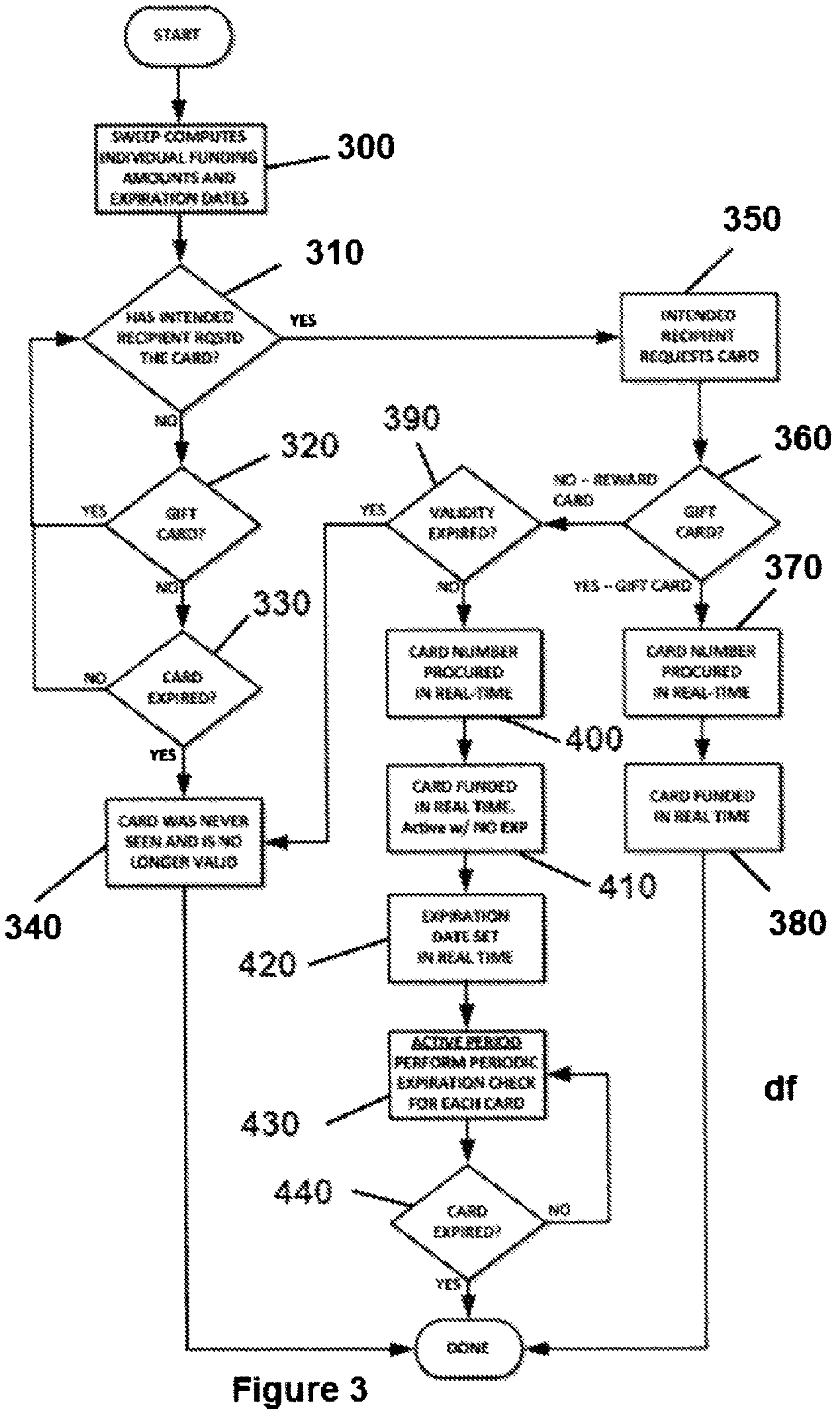
FIG. 3 is an exemplary flow chart diagram depicting the steps involved in delayed funding of one embodiment of the present invention.

Referring to FIG. 3, one embodiment of a flow chart depicting steps involved in the delayed funding of a virtual card is shown. In step 300, the individual funding amount, card number and any expiration dates for the cards is stored in a database. While the present example only indicates expiration dates for reward cards, it is appreciated that, where permitted by law and desired by the merchant or other entity, that the gift cards also may have expiration dates and not depart from the scope of the invention. It is further appreciated that the merchant system may procure the card numbers, or that the expiration dates may be set, at the time of funding, thereby further deferring the associated frees from the database of record.

If the system determines in step 310 that the recipient or card user has not requested the card, then it may be determined whether the card is a gift card or a reward card in step 320 and, in the case of a reward card, whether the card has an expiration date that has passed in step 330. If the system determines that the card has expired, the card will not be funded and no fees will be incurred by the merchant in step 340. Otherwise, the system will determine if the card has been requested until such time that the card expires.

If a card is requested in step 350, the system will determine whether the card may include an expiration date in step 360. If the card is a gift card or otherwise is not subject to an expiration date, the card number may be procured in step 370 and the card funded using a real time interface in step 380. As set forth above, it is also appreciated that the card numbers may be obtained in advance prior to funding. It is further appreciated that the funding and card information (e.g., expiration and card numbers) may occur via batch file transfer with the database of record after the card is presented for redemption.

If, on the other hand, it is determined in step 360 that the card is a reward card or a card that includes an expiration date, the system will check to see if the expiration date has passed in step 390. If the expiration date has passed, then the card will not be funded and no service fees will be incurred by the merchant. If the card has not expired, then the card number may be procured in step 400 and the card funded in real time in step 410. If the expiration date is tied to the date the card is first used or requested, then the system may set the expiration date in step 420. Once activated and used, the system will determine in steps 430 and 440 whether the card has expired (e.g., the value of the card or number of uses has been met, or the expiration date has lapse), wherein the system may permit the continued use of the card until it is determined that it has expired.

Figure 4A:
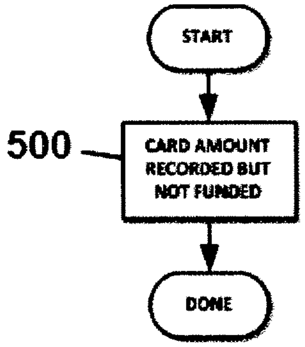
FIGS. 4*a* and 4*b* are illustrative flow chart diagrams depicting one embodiment of the steps involved for delayed funding of a physical gift card.
Figure 4B:
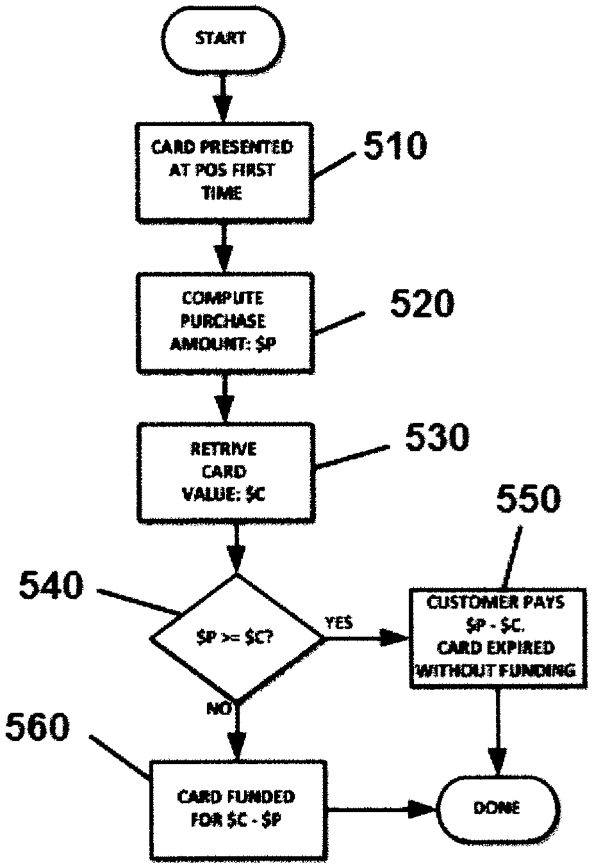

Referring now to FIGS. 4*a* and 4*b*, one embodiment of flow chart depicting steps involved in the purchase and delayed funding of a physical card such as a gift or reward card is shown. As shown in FIG. 4*a*, when purchased by a consumer, the amount of the gift card is recorded in the merchant's system or other computer database in step 500, but is not funded. Once the card is presented for its first use, whether at the point of sale or online in step 510, the system determines or receives information regarding the total purchase amount in step 520. After retrieving information on the card's value in step 530, the system compares the value of the card to the purchase amount in step 540. If the purchase price exceeds the value of the card, the value of the card is subtracted from the purchase price and is never funded in step 550, thereby avoiding the associated transaction costs. If the purchase price is less than the value of the card, the card is funded through the database of record in step 560 and the difference between the initial value of the card and the purchase amount is stored in a database for future use. In the case of a card that expires, the system may also initially check to determine whether the expiration date has passed prior to comparing the value of the card to the purchase amount. If the expiration date has passed, the card will expire without being funded, again avoiding transaction fees.

In another embodiment, the card may be funded on its first presentation for use, regardless of whether the amount of purchase exceeds the card's value. Accordingly, the general steps involved would be to fund the card upon its receipt for use based on information stored on the system, perform a balance inquiry for the card, and then debit the amount of the purchase up to the card's value. In this case, savings will be reaped from the deferment of funding until its first use. It is further appreciated that the step of checking the balance of the card may be skipped as the value of the card is known due to its funding.

It is appreciated that the application of the system and method for physical cards are more suited to a closed loop or private systems that are limited to, for example, a single merchant or retainer as the initial information regarding the initial balance and funding status may be stored in the merchant's system. However, it is appreciated that a third party or central database may be used to store this information remotely and not depart from the scope of the present invention, wherein the information may be stored and only funded if the purchase price is less than the initial value of the card.

It will be understood that modifications and variations may be effected without departing from the scope of the novel concepts of the present invention, but it is understood that this application is limited only by the scope of the appended claims.

The invention claimed is:

1. A method for efficient funding of cards having a redemption value comprising the steps of:

providing at least one unfunded card with a redemption value to a consumer;

storing information of the redemption value of the unfunded card in an electronic database;

determining whether the consumer has presented the unfunded card for redemption; and determining a purchase value when the unfunded card is presented for redemption;

using a processor to compare the purchase value with the redemption value of the unfunded card stored in the electronic database; and using a communication module to provide instructions to a third party database for the unfunded card to be funded when it is presented for redemption and the redemption value exceeds the purchase value; or electronically subtracting the redemptive value of the unfunded card from the purchase value without funding the unfunded card if the purchase value exceeds the redemption value.

2. The method of claim 1 wherein the funded card is funded in real time.

3. The method of claim 1 wherein the funded card is funded using a real time interface.

4. The method of claim 1 wherein the funded card is funded using a batch transfer.

5. The method of claim 1 which further comprises the step of determining whether the at least one unfunded card is valid.

6. The method of claim 5 wherein the step of determining the validity of the at least one unfunded card includes the steps of determining if the card has an expiration date that has passed.

7. The method of claim 6 wherein the expiration date is set when the at least one unfunded card is funded.

8. The method of claim 1 wherein the at least one unfunded card is a virtual card.

9. The method of claim 1 wherein the at least one unfunded card is a physical card.

10. The method of claim 1 wherein card identifying information is procured when the at least one unfunded card is funded.

11. The method of claim 10 wherein the card identifying information includes a card number.

12. The method of claim 10 wherein the card identifying information includes a card balance.

13. A system for facilitating the efficient funding of cards having a redemption value, the system comprising:

means for providing an unfunded card with a redemption value to a consumer;

a database for storing information about the unfunded card, the information including the redemption value;

a point of sale device, wherein the unfunded card may be presented to the point of sale device for purchasing one or more items;

a processor for comparing a purchase value of the one or more items and the redemption value of the unfunded card; and a communication module for providing instructions to a database of record to fund the unfunded card if the redemption value of the card exceeds the purchase value of the one or more items, wherein the redemption value of the unfunded card will be subtracted from the purchase value without funding the unfunded card if the purchase value exceeds the redemption value.

14. The system of claim 13 wherein the unfunded card is a physical card.

15. The system of claim 13 wherein the unfunded card is a virtual card.

16. The system of claim 13 wherein the processor determines whether the unfunded card is valid.

17. The system of claim 16 wherein the processor determines whether the unfunded card has expired.

18. A system for facilitating the efficient funding of a virtual card having a redemption value, the system comprising:

means for providing an unfunded virtual card with a redemption value to a consumer, wherein the unfunded virtual card may be provided to the system for acquiring one or more items having a purchase value;

a database that stores information about the unfunded virtual card, the information including the redemption value;

a processor that determines the validity of the unfunded virtual card; and a communication module that provides instructions to a database of record to fund the unfunded virtual card when the redemption value exceeds the value of the one or more items, and the unfunded virtual card is determined to be valid, wherein the redemptive value of the unfunded virtual card will be subtracted from the purchase value without funding the unfunded card if the purchase value exceeds the redemptive value.

19. A method for efficient funding of virtual cards having a redemption value comprising the steps of:

providing an unfunded virtual card with a redemption value to a consumer;

storing information of the redemption value of the unfunded virtual card in an electronic database;

determining whether the consumer has presented the unfunded virtual card for redemption;

determining the validity of the unfunded virtual card;

determining a purchase value when the unfunded virtual card is presented for redemption;

using a processor to compare the purchase value with the redemption value of the unfunded virtual card stored in the electronic database; and using a communication module to provide instructions to a third party database for the unfunded virtual card to be funded when it is presented for redemption and the redemption value exceeds the purchase value, wherein the redemptive value of the unfunded virtual card will be subtracted from the purchase value without funding the unfunded card if the purchase value exceeds the redemptive value.

* * * * *